October 20, 1913.

DRAWING 5,710

A careful search has been made this day for the original drawing or a photolithographic copy of the same, for the purpose of reproducing the said drawing to form a part of this book, but at this time nothing can be found from which a reproduction can be made.

Finis D. Morris,
        Chief of Division E.

AWK

UNITED STATES PATENT OFFICE.

WM. PHIPPS BLAKE, OF NEW YORK, N. Y.

SPRING FISH-HOOK.

Specification of Letters Patent No. 5,710, dated August 15, 1848.

*To all whom it may concern:*

Be it known that I, WILLIAM PHIPPS BLAKE, of the city and county and State of New York, have invented a new and Improved Spring-Hook for Catching Fish, which I denominate the "Expansion-Hook;" and I do hereby declare that the following is a full and exact description.

The nature of my invention consists in making a spring hook which when presented to the fish is compact and can readily be taken into the mouth, which, acting upon it, it is caused to expand, and the fish is hooked on two sides of his mouth.

The peculiarity of this hook and which distinguishes it from all other hooks, is its occupying a small space when set, and its being capable of expansion in the mouth which is caused by the fish biting upon it, and not by pulling on the line which it is necessary to do with other spring hooks in order to spring them.

My expansion hook consists of a spring in the shape of either a loop or helix, to both ends of which are attached hooks of the ordinary form with their backs turned toward each other; or I prefer to make the hooks and spring in one piece. The spring is so formed, that when the hook is "sprung" or not "set" and confined, they stand apart some distance, but, when baited and in use, they can be brought together and made to pass each other until the distance between their points is about equal to the width of one hook. They are confined in this position by means of a notch, groove, or projection on one limb or shank, which catches upon, or into, the other limb, (which is filed to fit it). The points are made with, or without barbs, and are bent slightly to one side in such manner that the pressure of the mouth or throat of the fish upon them, will throw them apart; when they immediately expand.

In the drawings annexed, Figure 1 represents the expansion hook when sprung, and Fig. 2 the same as it appears when set for use.

The looped portion above the dotted line, *a*, constitutes the spring, (which may be plain or spiral). The notch, projection, or catch is formed on the curved portion (*b*, Fig. 1) and (*b'*, Fig. 2), the limbs of the spring are so bent that they cross without interference at *d*, (Fig. 2). The hook is attached to the line, at the bend of the spring, by tying the line immediately to it, or by binding on a loop to which the line can be noosed; it may be baited as the ordinary hooks are; being particularly suitable for artificial flies, care being taken if the bait is large not to place it to interfere with the catch but if worm bait be used the pressure and friction of the limbs on coming together will cut it so as to allow it to catch.

I do not claim the invention of a spring hook to expand in the inside of the mouth in which the hooks are brought merely back to back, and confined by means of a movable slide and which cannot be sprung till the fish is fairly hooked; but

What I claim as my invention and desire to secure by Letters Patent, is—

The construction of an expanding, spring, hook with a catch without movable joints, bearings, or slides; and in such manner that when set it occupies about the same space as an ordinary hook, also the confining of the hook in a set state (so that the biting of the fish will spring it) by means of a notch or projection on one limb, or shank of the hook, into or on which the opposite limb or shank catches, all substantially in the manner herein set forth.

WM. P. BLAKE.

In presence of—
   ELIHU BLAKE,
   CHARLES T. BLAKE.